United States Patent [19]

Raj

[11] Patent Number: 5,009,938
[45] Date of Patent: Apr. 23, 1991

[54] CUSTOMIZED AUTOMOBILE

[75] Inventor: Joseph T. Raj, Riverview, Mich.

[73] Assignee: Evans Automotive, Division of Evans Industries, Inc., Wayne, Mich.

[21] Appl. No.: 475,356

[22] Filed: Feb. 5, 1990

[51] Int. Cl.$^5$ .............................................. B62D 25/06
[52] U.S. Cl. ........................................ 428/31; 296/210
[58] Field of Search ........................... 428/31; 296/210

[56] References Cited

U.S. PATENT DOCUMENTS

| | | | |
|---|---|---|---|
| 3,709,770 | 1/1973 | Hale | 428/31 X |
| 3,926,471 | 12/1975 | Nadasi et al. | 428/31 X |
| 4,239,279 | 12/1980 | Gonas et al. | 296/210 |
| 4,268,552 | 5/1981 | Duvdevani et al. | 428/31 |
| 4,308,704 | 1/1982 | Lloyd | 428/31 X |
| 4,699,420 | 10/1987 | Priest et al. | 296/210 |
| 4,714,290 | 12/1987 | Eash | 428/31 X |
| 4,793,650 | 12/1988 | Raj | 296/210 |
| 4,891,085 | 1/1990 | Mulligan | 296/210 X |

Primary Examiner—Henry F. Epstein
Attorney, Agent, or Firm—Barnes, Kisselle, Raisch, Choate, Whittemore & Hulbert

[57] ABSTRACT

A customized automobile having a rear window and a top including a plastic cap overlying the rear window and a portion of the top and one or more sections provided in partially overlapping relation. The plastic cap and sections are provided with a cloth covering. In one form, each section includes a transverse raised portion to simulate the support structure of a convertible. The cap and sections may be provided in a kit so that the plastic cap maybe used alone or together with one or more section.

4 Claims, 4 Drawing Sheets

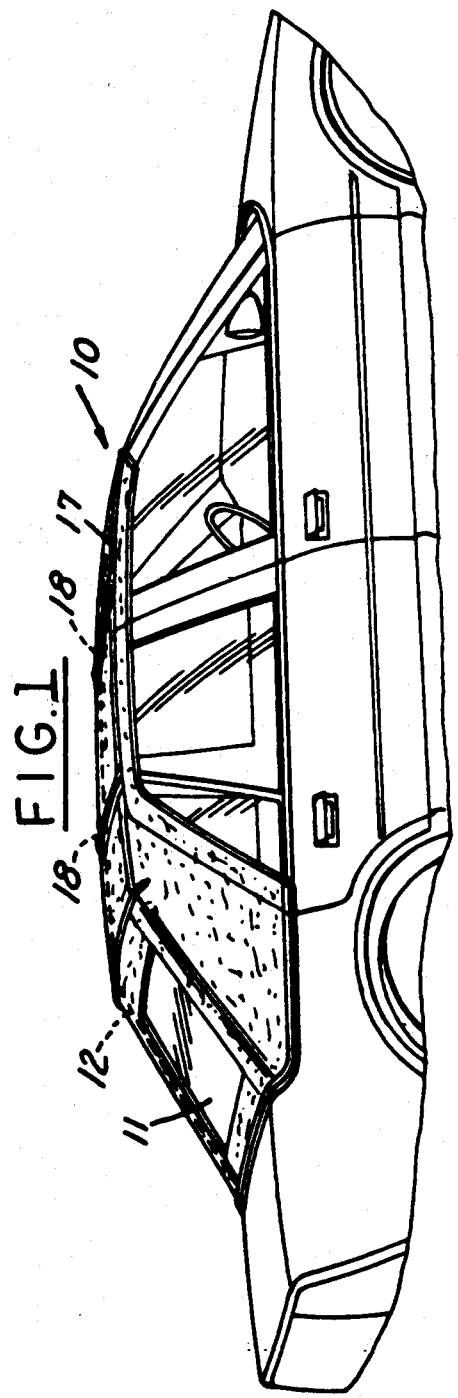
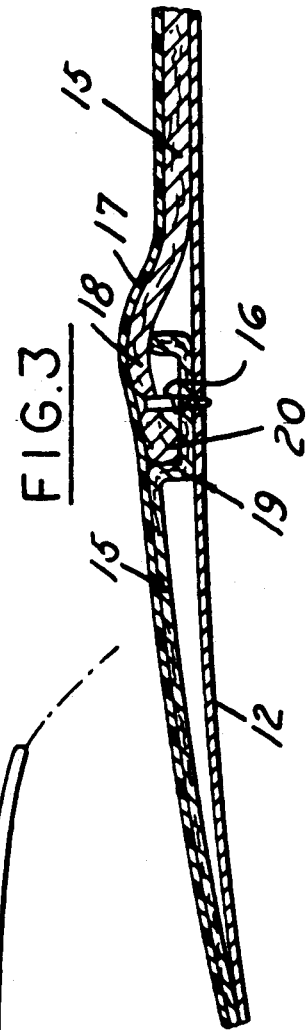
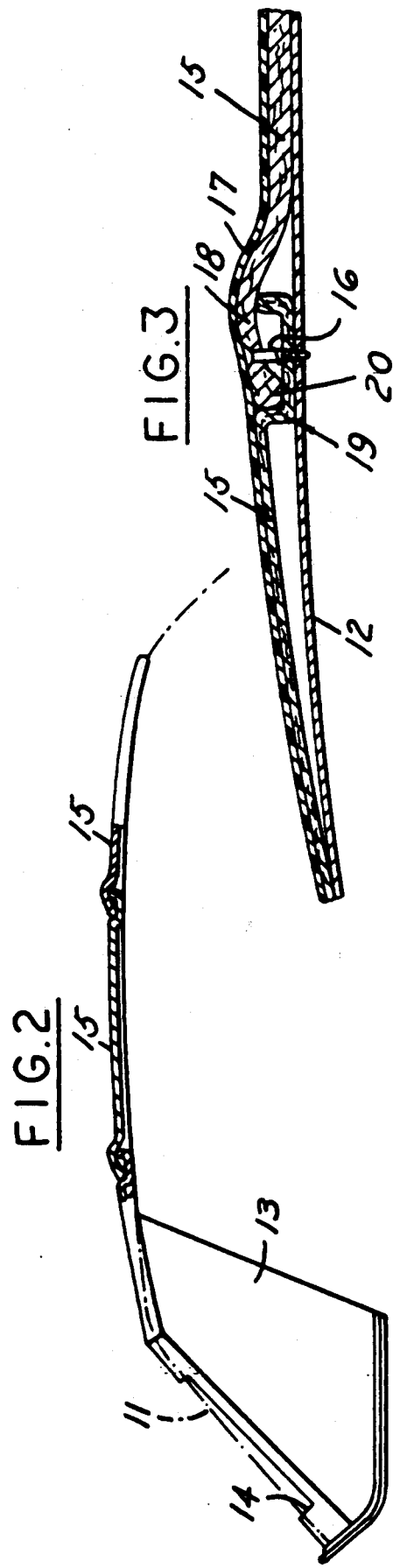

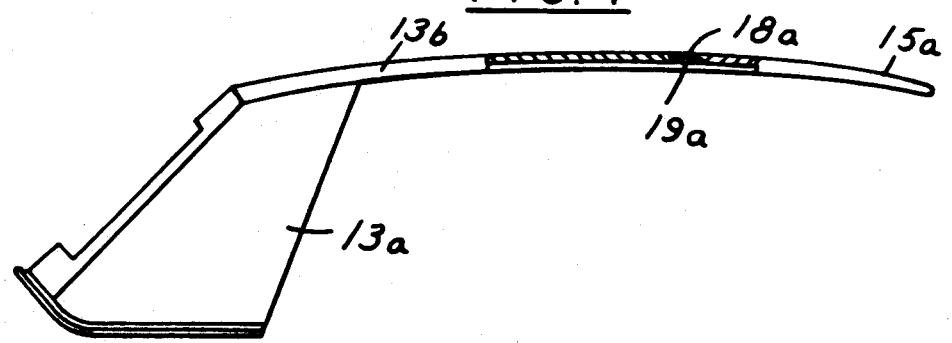
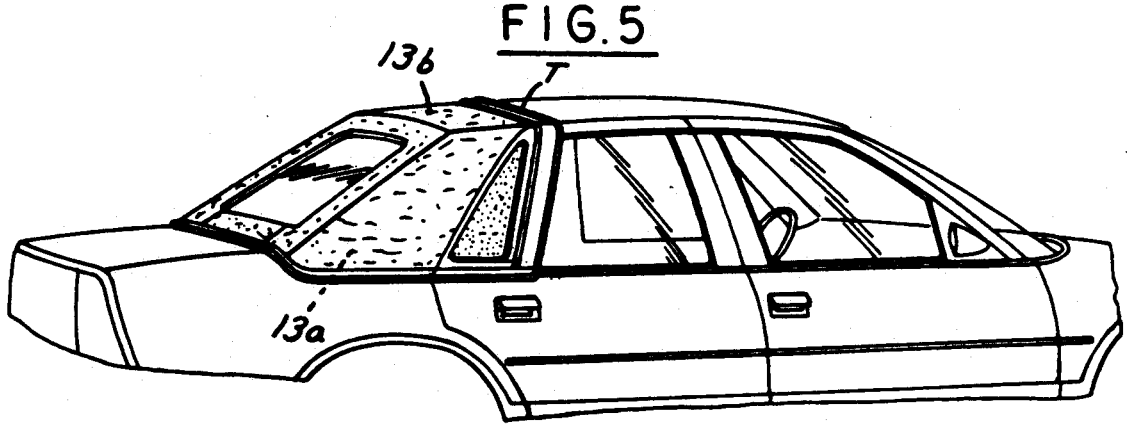

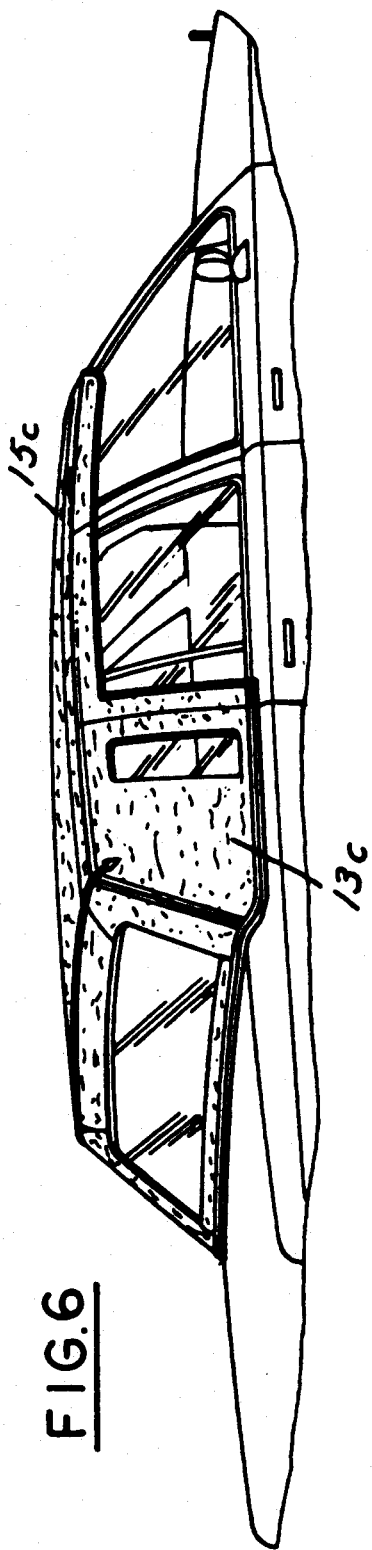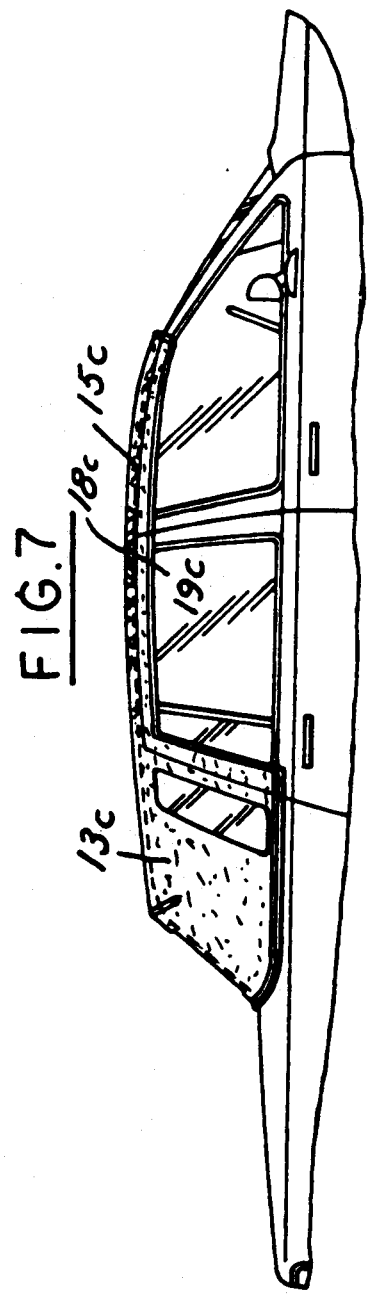

CUSTOMIZED AUTOMOBILE

This invention relates to customizing of automobiles particularly to customizing the top and rear window of automobiles.

BACKGROUND AND SUMMARY OF THE INVENTION

It is common in automobiles to provide a customizing of the rear window and top utilizing a plastic cap which is thereafter covered with a cloth covering. It has further been known to provide integral transverse ribs on the cap so that the final covering produces a simulated convertible top.

Among the objectives of the present invention are to provide a customized automobile and a method of making the customized automobile together with customized kit which provides the option of producing either an entire top covering or a partial top covering for the automobile.

In accordance with the invention a customized automobile is provided having a rear window and a top including a plastic cap overlying the rear window on a portion of top the and one or more sections provided in partially overlapping relation. The plastic in sections are provided with a cloth covering. In one form, each section includes a transverse raised portion to simulate the support structure of a convertible. The cap and sections may be provided in a kit so that the plastic cap maybe used alone or together with one or more sections.

BRIEF DESCRIPTION OF THE DRAWINGS

FIG. 1 is a longitudinal view of a automobile embodying the invention.

FIG. 2 is a part sectional longitudinal view through a portion of the automobile.

FIG. 3 is a fragmentary part sectional view on an enlarged scale.

FIG. 4 is a fragmentary part sectional longitudinal part sectional view of modified form of customized automobile.

FIG. 5 is a longitudinal view of a further modified form the automobile.

FIG. 6 is a fragmentary perspective view of another customized automobile.

FIG. 7 is a fragmentary part sectional side elevational view of the automobile.

DESCRIPTION

Figure 8:
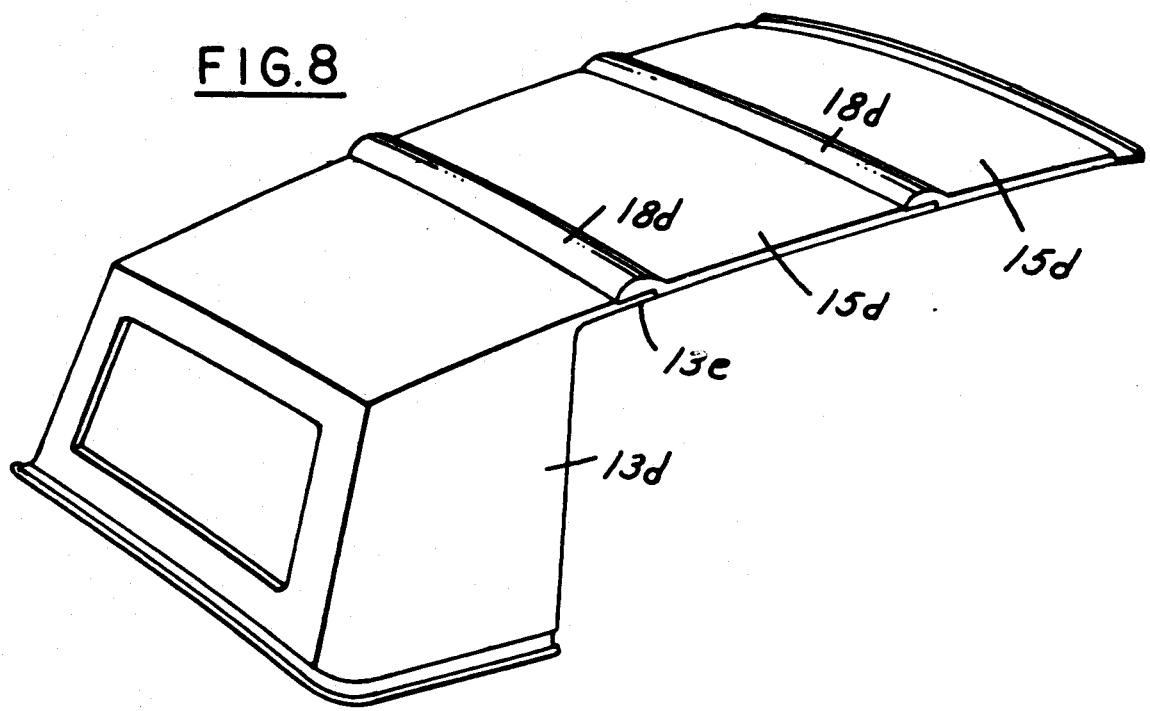
FIG. 8 is a perspective view of another form of top and roof sections.

Referring to FIGS. 1-3, there is shown an automobile 10 which has a rear window 11 and a top 12. In accordance with the invention, a plastic cap 13 with a rear window opening 14 is provided over the rear window 11 and a portion of the top 12 of the automobile. In addition, one or more plastic roof sections 15 are provided along the top with one section 15 partially overlapping the top portion of the cap 13 and one other section and are fastened thereto as by rivets or screws 16 or adhesives. The plastic cap and sections are adhered to the top of the vehicle by spot adhesives. A cloth covering 17 such as vinyl is then adhered to the top of the cap and sections to simulate a convertible. In the form shown, the sections 15 include an integral transversely raised portion 18 along one rearward transverse free edge so to that the covering is applied the supporting structure of a convertible top is simulated. Each section 15 includes an integral upwardly facing transverse channel section 19 along its other edge into which the free edge 20 of section 18 extends.

In the form of the invention shown in FIG. 4, the cap 13a and associated section 15a have, respectively, forward and rearward transverse free edges which from overlapping sections 19a, 18a respectively providing a flush appearance. In other words, they are not raised relative to one another. The sections are fastened to one another by rivets, screws or adhesives in the same manner as the prior form of the invention.

In the form shown in FIG. 5, the cap 13b is use alone without the sections.

The cap 13b may have a flat or channel shaped free edge into which a trim strip T is provided.

In the form shown in FIGS. 6 and 7, the automobile includes a cap 13c which has one or more roof sections 15c associated there with which are in partially overlapping relation and fasten together to provide a smooth appearing top.

Figure 9:
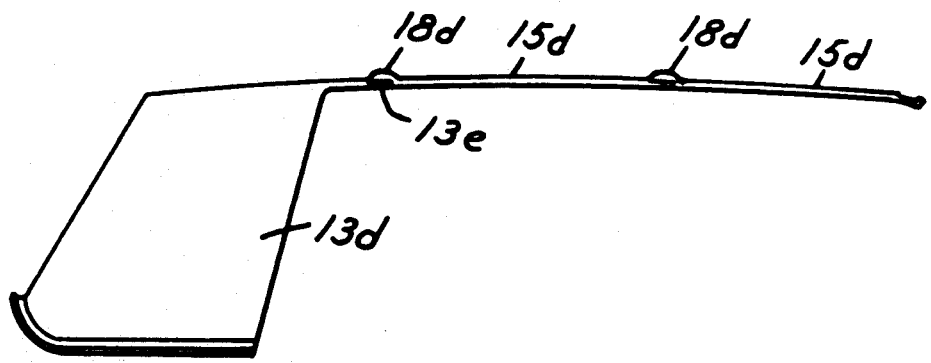
FIG. 9 is a side elevational view thereof.

In the form shown in FIGS. 8 and 9, the automobile comprises a cap 13d having a free edge 13e associated with a plurality of plastic sections 15d each of which has a transverse free edge raised portion 18d which overlaps the respective free edges of the cap 13d and the opposed free edge of the adjacent section 15d.

What is claimed is:

1. For use in customizing an automobile having a front window, a rear window and a top,
   a plastic cap including a rear window portion and a top portion adapted to overlie the rear window portion and the top of the automobile respectively,
   at least one separate section adapted to be provided in partially overlapping relation to the top portion of the cap,
   said plastic cap and said at least one separate section having forward and rearward transverse free edges,
   said rearward transverse free edge of said at least one separate section being in overlying relation to said forward transverse free edge of said plastic cap, and
   wherein said at least one separate section extends in a longitudinal direction away from said read window toward said front window increasing the length of said top portion to further cover said top.

2. The plastic cap and sections set forth in claim 1 including a transverse raised portion on said section.

3. The plastic cap and sections set forth according to claims 1 or 2 including a plurality of additional sections in partially overlapping relation to an adjacent section.

4. The plastic cap and sections set forth in claim 3 wherein said overlapping sections include an upwardly extending channel and a transversely extending raised portion on one section having a free edge extending into the channel.

* * * * *